United States Patent
Leblouba

(10) Patent No.: US 12,498,014 B2
(45) Date of Patent: Dec. 16, 2025

(54) ENERGY DISSIPATION DEVICE FOR STRUCTURES AND EQUIPMENT

(71) Applicant: University of Sharjah, Sharjah (AE)

(72) Inventor: Moussa Leblouba, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 17/893,714

(22) Filed: Aug. 23, 2022

(65) Prior Publication Data
US 2024/0068543 A1    Feb. 29, 2024

(51) Int. Cl.
*F16F 15/02* (2006.01)
*F16F 7/01* (2006.01)
*E04H 9/02* (2006.01)

(52) U.S. Cl.
CPC ............ *F16F 15/021* (2013.01); *F16F 7/015* (2013.01); *E04H 9/0237* (2020.05); *F16F 2224/0208* (2013.01); *F16F 2232/08* (2013.01)

(58) Field of Classification Search
CPC ................................ F16F 15/021; F16F 7/015
See application file for complete search history.

(56) References Cited

U.S. PATENT DOCUMENTS

| | | | | |
|---|---|---|---|---|
| 1,787,638 A | * | 1/1931 | Moore | F16J 1/22 92/160 |
| 4,759,428 A | * | 7/1988 | Seshimo | F16L 3/202 188/312 |
| 2007/0023245 A1 | * | 2/2007 | Lau | B60G 17/0152 188/312 |
| 2012/0181734 A1 | * | 7/2012 | Zeidan | F16C 17/03 267/136 |
| 2015/0129379 A1 | * | 5/2015 | Pierini | F16F 9/145 188/267.2 |
| 2015/0159722 A1 | * | 6/2015 | Stebbins | F16F 9/145 188/296 |

FOREIGN PATENT DOCUMENTS

| | | | |
|---|---|---|---|
| CN | 209941942 U | * | 1/2020 |
| CN | 210752229 U | * | 6/2020 |
| CN | 112121671 A | * | 12/2020 |
| DE | 1180283 B | * | 10/1964 |
| DE | 102006022563 A1 | * | 11/2007 |
| EP | 0879567 B1 | * | 12/2001 |
| FR | 447485 A | * | 1/1913 |
| JP | 60053239 A | * | 3/1985 |

* cited by examiner

*Primary Examiner* — Melody M Burch
(74) *Attorney, Agent, or Firm* — MH2 Technology Law Group, LLP

(57) ABSTRACT

The present disclosure relates to an energy dissipation device and system, comprising a hollow cylinder adapted to be filled with solid balls, and a longitudinal member/shaft having short rods protruding radially therefrom. The shaft having rods is movably disposed of within the hollow member and solid balls are filled and secured in the cylinder thereafter, such that two ends of the longitudinal member extend outside of the hollow member, and the rods and solid balls remain within the hollow cylinder. The ends of the device may be configured with structures or equipment. The movement of the shaft along a longitudinal axis of the cylinder, upon receiving an energy impact in an event of seismic activity, wind loads, and/or man-made vibrations, results in friction between the solid balls and the rods of the shaft, which facilitates dissipation of the received energy.

7 Claims, 6 Drawing Sheets

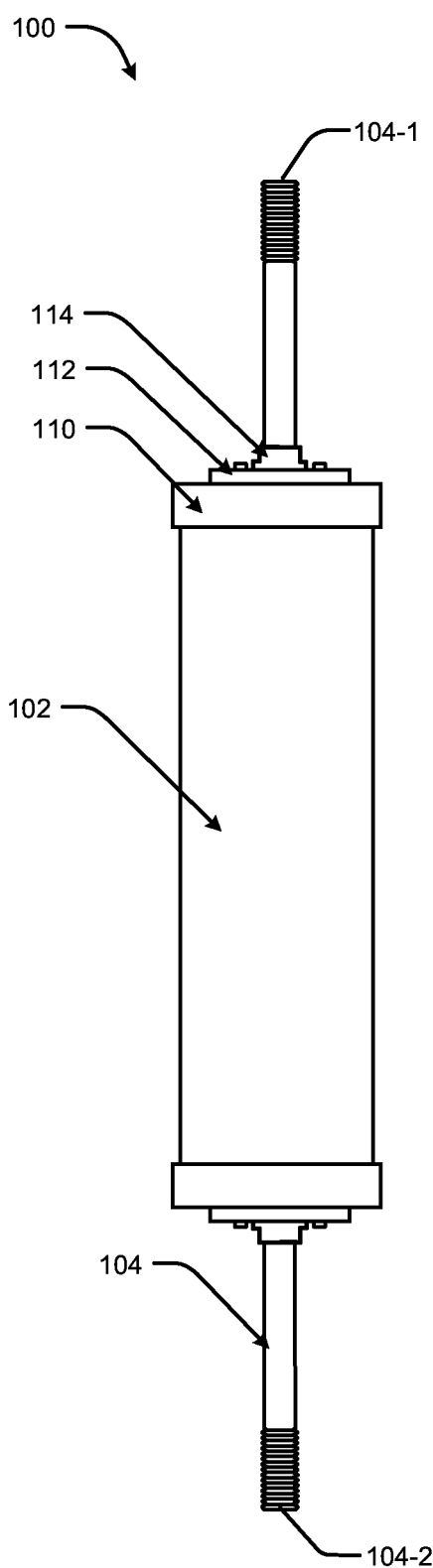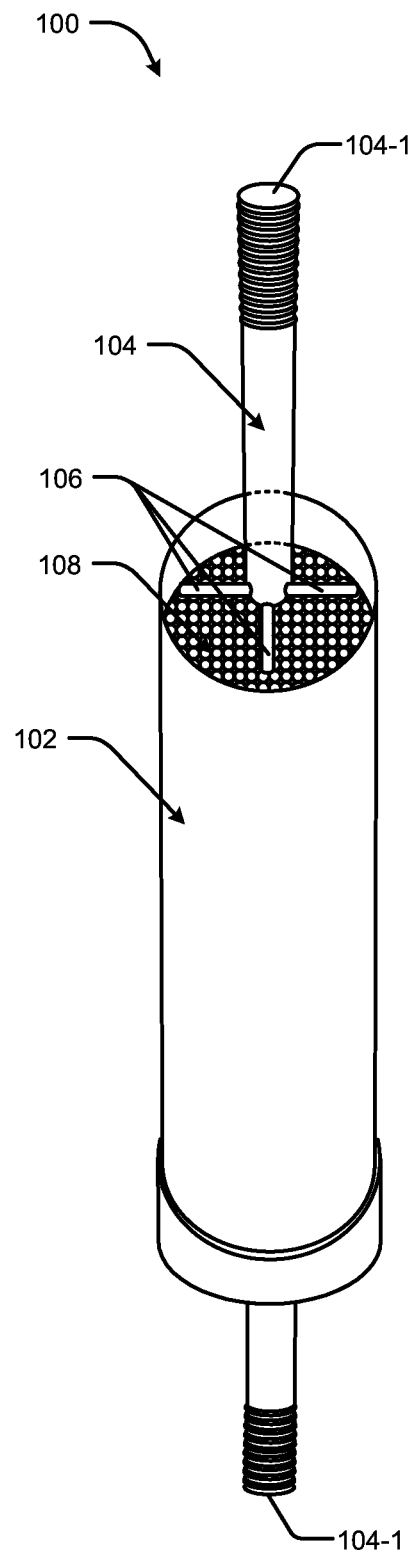
FIG. 1A                    FIG. 1B

ENERGY DISSIPATION DEVICE FOR STRUCTURES AND EQUIPMENT

FIELD OF THE INVENTION

The present disclosure relates to the field of energy dissipation systems. More particularly, the present disclosure relates to a simple, efficient, and cost-effective energy dissipation solution for structures and equipment, which dissipates vibration forces such as seismic activity, wind forces, and man-made vibrations, and which is easy to be assembled and does not require any source of power to operate.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Energy dissipation devices are used in structures to limit vibration induced by winds or to dissipate the energy generated by seismic events. These devices absorb or consume a portion of the input energy from earthquakes or wind, reduce the structural response, and protect the structural members to some extent. Traditionally, isolation systems are employed between the foundation and base elements of the structures, which are designed to have less amount of lateral stiffness relative to the main structure in order to absorb more of the earthquake energy. A supplemental damping system is further attached to the isolation system to reduce the displacement of the isolated structure as a whole. These dampers are activated by the movement of the structure and decrease the structural displacements by dissipation energy via different mechanisms.

These energy dissipation devices generally involve multiple truss members providing support to the structures. In some devices, a viscous fluid or viscoelastic fluid is provided, which gets activated as low displacement to provide restoring force and absorb the input energy to some extent. However, such fluid-based energy dissipation devices have limited energy dissipation capability, and chances of possible fluid leakage are also very high, thereby making them reliable, costly, and difficult to operate and maintain. Moreover, some of the devices are provided with deformable metallic members that deform and absorb a portion of the input energy. However, these metallic damper-based energy dissipation devices have a non-linear behavior and require complete replacement after one implementation. Besides, these devices have re-centering issues as it remains in a deformed state at the end of the vibrations. Further, all the existing passive energy dissipation devices have lower energy dissipation capability under small as well as large displacement amplitudes.

Another type of energy dissipation device is an active or semi-active device that monitor the structural behavior, and after processing the information, in a short time, generates a set of forces to modify the current state of the structure. Generally, an active control system involves a monitoring system that perceives the state of the structure and records the data using an electronic data acquisition system, a control system that decides the reaction forces to be applied to the structure based on the output data from the monitoring system, and an actuating system that applies the physical forces to the structure. To accomplish all this, these active devices require a continuous external power source. However, loss of power during a catastrophic event is highly likely, which may render these active devices ineffective. Besides, these active devices are costly and require skilled personnel to install and maintain the overall arrangement in structures.

There is, therefore, a need to overcome the above-mentioned drawbacks, limitations, and shortcomings associated with exiting passive and active energy dissipation devices and provide a simple, efficient, and cost-effective energy dissipation solution for structures and equipment, which efficiently dissipates vibration forces or energy such as seismic activity, wind forces, and man-made vibrations, and which is easy to be assembled and does not require any source of power to operate.

SUMMARY OF THE INVENTION

The present disclosure relates to a simple, efficient, and cost-effective energy dissipation solution for structures and equipment, which dissipates vibration forces or energy such as seismic activity, wind forces, and man-made vibrations, and which is easy to be assembled and does not require any source of power to operate.

An aspect of the present disclosure pertains to a system and device for dissipation of vibration forces or energy received on structures and equipment due to seismic activity, wind forces, and man-made vibrations. The structures may be associated with buildings, electrical system installations, communication system installations, and the like. Further, the structures may also be associated with vehicles, airplanes, aerospace vehicles, ships, artifacts, and the like. The equipment may be scientific equipment or military equipment, where undesirable vibration is to be restricted. The energy dissipation device and system are configured to be easily installed in these structures and equipment, which later on facilitates dissipation of any vibration force or energy impact received on these structures or equipment, due to seismic activity, wind forces, and man-made vibrations.

The present invention (system and device) may involve a hollow cylindrical member (cylinder) that is be adapted to be filled with a plurality of solid balls. Further, a longitudinal member (shaft) comprising a plurality of rods protruding radially along a length of the longitudinal member is movably disposed of within the hollow cylinder such that two ends of the longitudinal member extend partially outside of the hollow cylinder and the plurality of rods remains within the hollow cylinder. The solid balls may be completely filled in the hollow cylindrical member once the longitudinal member is disposed of within the hollow cylinder. Later on, the two ends of the hollow cylinder may be closed by a cap and a solid disk and linear bearings may be provided at each end, such that the longitudinal member extends out of the hollow cylinder through the opening of the disks and the solid balls remains in contact with the rods and secured within the hollow cylinder, but allowing the longitudinal member to linearly move along a longitudinal axis of the hollow cylinder upon receiving an energy impact or force. Accordingly, the movement of the longitudinal member along the longitudinal axis of the hollow member, upon receiving an energy impact on the structure or equipment, results in friction between the solid balls and the rods, which facilitates dissipation of the received energy.

In an aspect, the rods may be removably configured with the longitudinal member, wherein multiple threaded holes may be provided a length of the longitudinal member.

Further, one end of each rod may also be provided with a threaded portion. The threaded holes of a longitudinal member may have a diameter based on the cross-section of the rods, such that the threads of the rods may engage and lock in the threaded holes of the longitudinal member, which may facilitate removable coupling of the rods to the longitudinal member.

The two ends of the longitudinal member are configured to be attached to structural members associated with the structure or equipment such that an energy impact on these structural members causes movement of the longitudinal member of the device, which results in friction between the solid balls and the rods, thereby facilitating dissipation of the energy impact.

In another aspect, multiple energy dissipation devices may be configured in the structure or equipment as per requirement and load, such that two ends of all the devices remain configured with the structural members forming an energy dissipation system. Accordingly, when the structure or equipment receives energy or vibration force due to seismic event, wind force, or man-made vibrations, the longitudinal member of corresponding devices may move along the longitudinal axis of the corresponding hollow member, which results in friction between the solid balls and the rods, thereby facilitating dissipation of the received energy. Thus, the device and system are capable of dissipating energy under small as well as large displacement amplitudes. Therefore, it can be used for applications where small vibrations are anticipated (e.g., in buildings subjected to minor to moderate winds and man-made vibrations such as the case of train-induced vibrations) as well as in case of large vibrations (e.g., strong wind loads and strong earthquake ground motions).

The system may comprise a set of coupling members that are adapted to couple the ends of the longitudinal member associated with each of the devices to the structural member or the equipment as required. This also allows easier replacement and maintenance of one or more energy dissipation devices when required, without removing or affecting the other energy dissipation devices.

Thus, the present invention provides a simple, efficient, and cost-effective energy dissipation solution for structures and equipment, which dissipates vibration forces or energy such as seismic activity, wind forces, and man-made vibrations. Besides, the device requires a small number of components that are easily available and are also affordable, which can be easily assembled on-site and can be installed in the structure or equipment after they are built. Further, unlike active and semi-active devices, the proposed device does not require any source of power to operate, which makes it highly reliable and less prone to failure. Moreover, as all the components of the device are easily separable from each other, as a result, in case of failure or damage to any one of the components, the whole device is not required to be replaced and only the faulty component is required to be replaced or serviced.

The present invention can achieve increased friction with increased movement amplitude. Further, different device configurations can be employed based on requirement to suit different types and magnitudes of loads on which the hosting structure is subjected to. Configurations of the device can include the number, position, and shape of the rods attached radially to the shaft and the number, material type, and diameter of the balls. Other configurations can include the length of the cylinder and shaft. With these configurations, user can achieve greater energy dissipation while accommodating small and large displacement amplitudes and loading speeds.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings. In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 1A illustrates an exemplary view of the energy dissipation device, in accordance with an embodiment of the present invention. FIG. 1B illustrates an exemplary open view of the energy dissipation of FIG. 1A showing the inner solid balls and short rods.

DETAILED DESCRIPTION OF THE INVENTION

Figure 2A:
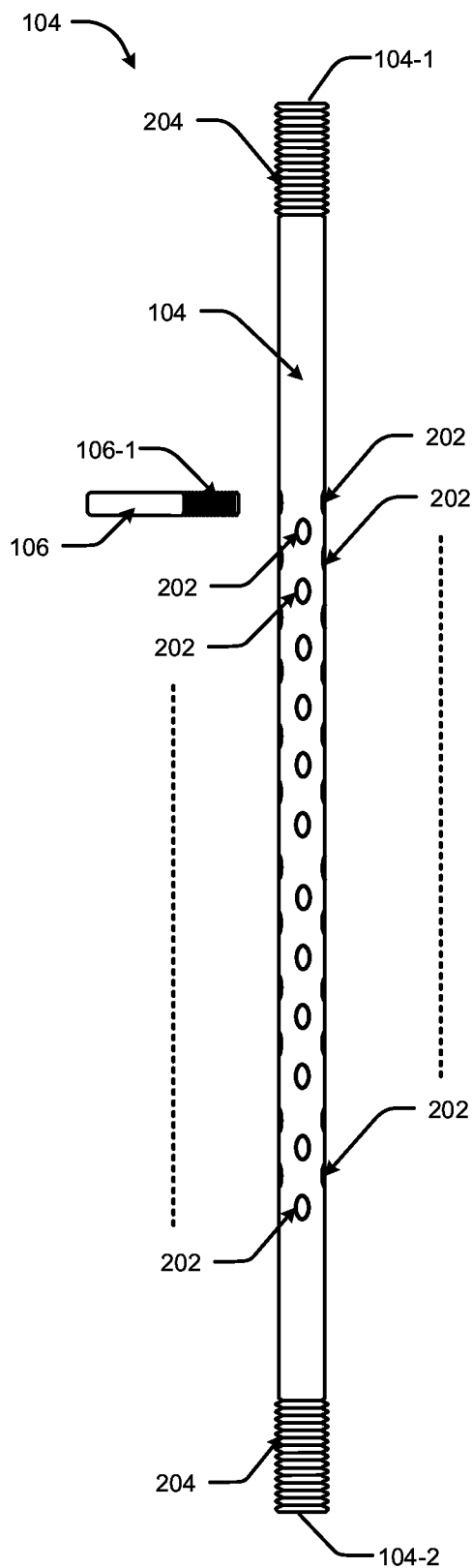
FIG. 2A illustrates an exemplary view of the longitudinal member (shaft) having threaded holes for the short rods, in accordance with an embodiment of the present invention.
Figure 2B:
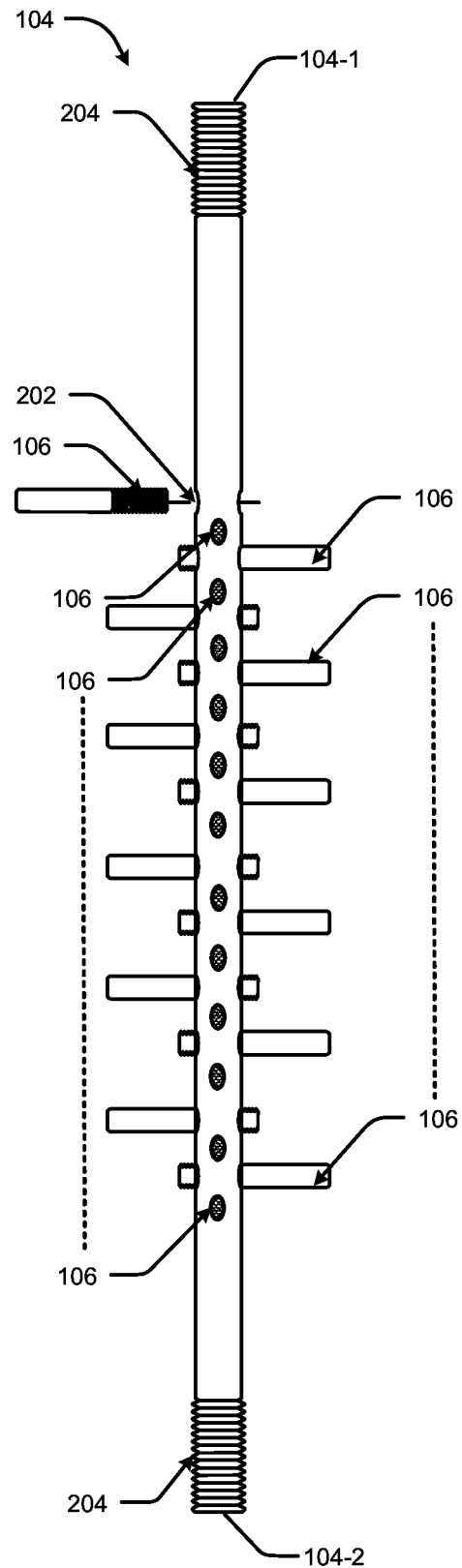
FIG. 2B illustrates an exemplary view of the longitudinal member having the short rods protruding from it, in accordance with an embodiment of the present invention.

The aspects of a simple, efficient, and cost-effective approach for energy dissipation in structures and equipment in an event of seismic activity, wind forces, and man-made forces, according to the present invention will be described in conjunction with FIGS. 1A-5C. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

If the specification states a component or feature "may", "can", "could", or "might" be included or have a characteristic, that particular component or feature is not required to be included or have the characteristic. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element from another. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It is an object of the present disclosure to overcome the above-mentioned drawbacks, limitations, and shortcomings associated with exiting active and passive energy dissipation devices. It is an object of the present disclosure to dissipate energy or forces received by structures and equipment in an event of seismic activity, wind forces, and man-made forces. It is an object of the present disclosure to provide a simple, efficient, and cost-effective approach for energy dissipation in structures and equipment in an event of seismic activity, wind forces, and man-made forces. It is an object of the present disclosure to manufacture an energy dissipation device that dissipates energy under small as well as large displacement amplitudes.

It is an object of the present disclosure to manufacture an energy dissipation device that requires a small number of pieces that are affordable and readily available. It is an object of the present disclosure to provide an energy dissipation device that does not require electrical power to operate. It is an object of the present disclosure to provide an energy dissipation device that doesn't suffer from re-centering issues (e.g., it doesn't remain in a deformed state by the end of vibrations). It is an object of the present disclosure to provide an energy dissipation device that is not required to be completely replaced in case of failure or damage to any one of the components, and only the faulty component is required to be replaced or serviced.

The present disclosure relates to a simple, efficient, and cost-effective energy dissipation solution for structures and equipment, which dissipates vibration forces or energy such as seismic activity, wind forces, and man-made forces, and which is easy to be assembled and does not require any source of power to operate.

According to an aspect, the present disclosure elaborates upon an energy dissipation device including a hollow member adapted to be filled with a plurality of solid balls, and a longitudinal member including a plurality of rods protruding radially from the longitudinal member. The longitudinal member can be movably disposed of within the hollow member such that two ends of the longitudinal member extend at least partially outside of the hollow member and the plurality of rods remains within the hollow cylinder. Accordingly, the movement of the longitudinal member along a longitudinal axis of the hollow member, upon receiving an energy impact, results in friction between the plurality of solid balls and the plurality of rods, which facilitates dissipation of the received energy.

According to another aspect, the present disclosure elaborates upon an energy dissipation system for structural members and equipment. The system includes one or more energy dissipation devices removably configured with any of the structural members or the equipment. Each of the devices can include a hollow member adapted to be filled with a plurality of solid balls, and a longitudinal member including a plurality of rods protruding radially from the longitudinal member. The longitudinal member is movably disposed within the hollow member such that two ends of the longitudinal member extend at least partially outside of the hollow member and the plurality of rods remains within the hollow cylinder. The two ends of the longitudinal member of each device are adapted to be attached to the structural member or equipment, such that an energy impact on the structural member or the equipment causes movement of the longitudinal member along a longitudinal axis of the hollow member, which results in friction between the plurality of solid balls and the plurality of rods, thereby facilitating dissipation of the energy impact In an embodiment, the hollow member is cylindrical shaped, and the longitudinal member is a solid cylindrical shaft. In an embodiment, the device comprises a solid disk with an opening being removably configured at each end of the hollow cylinder. The dimension of the opening of the disk can be based on the cross-section of the longitudinal member such that when the solid disks are attached at each end of the hollow cylinder, the longitudinal member extends out of the hollow cylinder through the opening of the disks and the plurality of solid balls remains secured within the hollow cylinder. In an embodiment, the device can include a cap with an opening being removably configured at each end of the hollow cylinder and adapted to enclose the two ends of the hollow cylinder. The dimension of the opening of the cap can be based on the cross-section of the longitudinal member such that when the caps are attached at each end of the hollow cylinder, the longitudinal member extends out of the hollow cylinder through the opening of the caps.

In an embodiment, the device can include two linear bearings configured at each end of the closed hollow cylinder to facilitate linear movement of the longitudinal member along the longitudinal axis of the hollow cylinder. The linear bearing can be attached to a surface of the cap or on the solid disk such that the opening of the disk, the opening of the cap, and the central opening of the linear bearing remains in line with each other.

In an embodiment, each of the plurality of rods can be removably coupled to the longitudinal member. In an embodiment, the longitudinal member can include a plurality of threaded holes configured radially along a length of the longitudinal member, where the threaded holes facilitate removable coupling of the plurality of rods to the longitudinal member. In an embodiment, one end of each of the plurality of rods can include a threaded portion adapted to engage and lock in the threaded holes of the longitudinal member, which facilitates the removal coupling of the plurality of rods to the longitudinal member.

In an embodiment, the two ends of the longitudinal member can be configured to be attached to any of a structural member or equipment, such that an energy impact on the structural member or the equipment causes movement of the longitudinal member, which results in friction between the plurality of solid balls and the plurality of rods, thereby facilitating dissipation of the energy impact.

In an embodiment, the hollow member is filled with a viscoelastic fluid, which increases and facilitates the dissipation of the received energy.

In an embodiment, each of the two ends of the longitudinal member can include a threaded portion adapted to engage and lock with a coupling member that is further adapted to be attached to any of structural members or equipment. In an embodiment, the structural members can be associated with any of a building, electrical installation, and communication system installation. In an embodiment, the structural members can be associated with any of vehicle, airplane, aerospace vehicle, ship, and artifact. In an embodiment, the equipment can be selected from scientific equipment, and military equipment, wherein the system or the corresponding devices reduce undesirable vibrations of the corresponding equipment.

Referring to FIGS. 1A and 1B, in an aspect, the proposed energy dissipation device 100 (also referred to as a device 100, herein) is disclosed. The device 100 can include a hollow member 102 that can be a hollow cylinder 102. Further, a longitudinal member 104 (also referred to as shaft 104, herein) having a plurality of short rods 106 (collectively referred to as rods 106, herein) protruding radially from the longitudinal member 104, can be movably disposed of within the cylinder 102 such that two ends 104-1, 104-2 of the longitudinal member 104 extend at least partially outside of the hollow cylinder 102 and the plurality of rods 106 remains within the hollow cylinder 102. The cylinder 102 can be adapted to be filled with a plurality of solid balls 108 that can be filled in the cylinder 102 once the longitudinal member 104 having rods 106 is disposed of within the cylinder 102. Later on, the two ends of the cylinder 102 can be closed to secure the solid balls 108 within the cylinder 102 while allowing the longitudinal member 104 to linearly move along a longitudinal axis of the cylinder 102. Accordingly, the movement of the longitudinal member 104 along the longitudinal axis of the hollow member 102, upon receiving an energy impact in an event of seismic activity, wind force, and man-made vibrations, results in friction between the solid balls 108 and the rods 106, which facilitates dissipation of the received energy.

The longitudinal member 104 can be of any shape to increase their contact with the solid balls 108, thereby increasing the friction and the energy dissipated through hysteresis. As shown in FIG. 1B, the solid balls 108 occupy the entirety of the cylinder 102 after inserting the longitudinal member 104 and rods 106. Further, the diameter of the balls 108 is designed to suit the needs of the application.

The device 100 can include a solid disk 112 with an opening being removably configured at each end of the cylinder 102. The dimension of the opening of the disk 112 can be based on the cross-section of the longitudinal member 104 such that when the solid disks 112 are attached at each end of the hollow cylinder 102, the longitudinal member 104 extends out of the hollow cylinder 102 through the opening of the disks 112 and the plurality of solid balls 108 remains secured within the hollow cylinder 102. Further, the device 100 can include a cap 110 with an opening being removably configured at each end of the hollow cylinder 102 and adapted to enclose the two ends of the hollow cylinder 102. The dimension of the opening of the cap 110 can also be based on the cross-section of the longitudinal member 104 such that when the caps 110 are attached at each end of the hollow cylinder 102, the longitudinal member 104 extends out of the hollow cylinder 102 through the opening of the caps 110.

In an embodiment, the device 100 can include two linear bearings 114 configured at each end of the closed hollow cylinder 102 to facilitate linear movement of the longitudinal member 104 along the longitudinal axis of the hollow cylinder 102. The linear bearings 114 can be attached either to a surface of the cap 110 or on the solid disk 112 such that the opening of the disk 112, the opening of the cap 110, and the central opening of the linear bearing remains in line with each other. This configuration of the solid disks 112, the caps 110, and the linear bearings 114 keeps the solid balls 108 secured within the cylinder 102 and allows the longitudinal member 104 to extend out of the cylinder 102, such that the longitudinal member 104 can linearly move along the longitudinal axis of the cylinder 102 upon receiving a force or energy impact on any of the ends of the longitudinal member 104 or the device 100.

Figure 3:
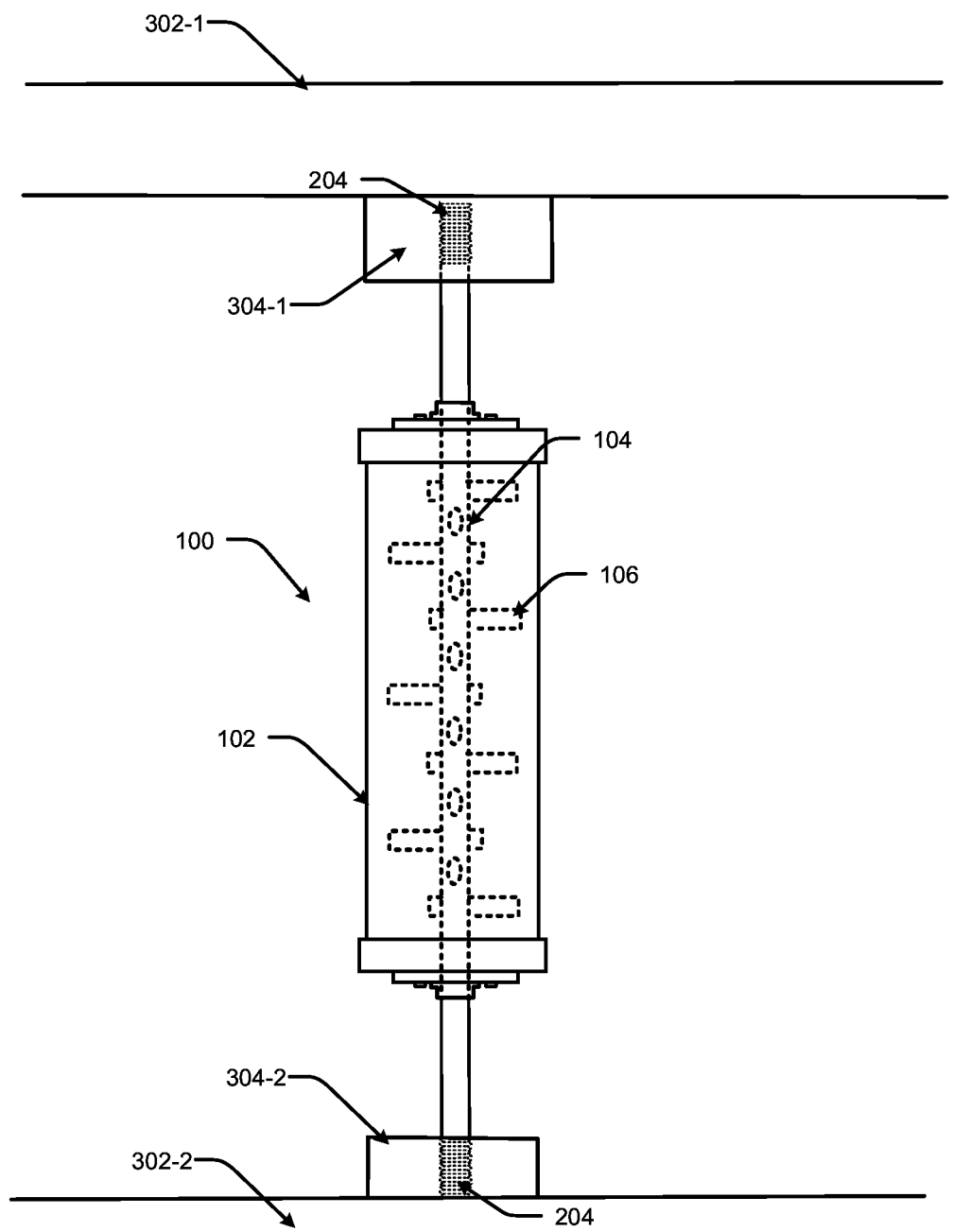
FIG. 3 illustrates an exemplary view depicting the energy dissipation installed between two structural members using coupling members, in accordance with an embodiment of the present invention.

Further, the two ends 104-1, 104-2 of the device 100 (or longitudinal member 104) can be configured to be attached to structural members 302-1, 302-2 associated with structures or equipment as shown in FIG. 3. Referring to FIGS. 1A to 3, each of the two ends 104-1, 104-2 of the longitudinal member 104 can include a threaded portion 204 adapted to engage and lock with a coupling member 304-1, 304-2 that can be further adapted to be attached to the structural members 302-1, 302-2. The threaded ends 204 of the longitudinal member 104 and the coupling members 304-1, 304-2 allow easier and faster installation of the proposed device 100 between structural members 302-1, 302-2 of structures or equipment.

Referring back to FIGS. 2A and 2B, an exemplary view of the longitudinal member 104 having radially protruding rods 106 is disclosed. The longitudinal member 104 can be in form of a solid shaft 104 provided with a plurality of threaded holes 202 configured radially along a length of the longitudinal member 104. The threaded holes 202 can facilitate removable coupling of the rods 106 to the longitudinal member 104 such that the rods 106 can be easily attached to and removed from the longitudinal member 104 as required. Further, one end of each of the rods 106 can include a threaded portion 106-1 that is adapted to engage and lock in the threaded holes 202 of the longitudinal member 104. This facilitates the removal of coupling or locking of the rods 106 to the longitudinal member 104. The rods 106 can protrude radially from the longitudinal member 104 such that the rods 106 remain perpendicularly oriented from the longitudinal axis or a length of the longitudinal member 104.

In another aspect (not shown), multiple numbers of proposed energy dissipation devices 100 can be configured between structural members associated with structures or equipment to form an energy dissipation system based on the requirement and loading on the structural members. In such a case, the two ends 104-1, 104-2 of the longitudinal member 104 of each device 100 can be configured with the structural member, such that an energy impact on the structural member or the equipment, can cause movement of the corresponding longitudinal member 104 along a longitudinal axis of the cylinder 102 of the respective devices 100, which can result in friction between the solid balls 108 and the rods 106, thereby facilitating dissipation of the energy impact.

Accordingly, when the structure or equipment receives energy or vibration force due to seismic event, wind force, or man-made vibrations, the longitudinal member 104 of corresponding devices 100 can move along the longitudinal axis of the corresponding hollow member 102, which results in friction between the solid balls 108 and the rods 106, thereby facilitating dissipation of the received energy. Thus, the device 100 and system are capable of dissipating energy under small as well as large displacement amplitudes. Therefore, it can be used for applications where small vibrations are anticipated (e.g., in buildings subjected to minor to moderate winds and man-made vibrations such as the case of train-induced vibrations) as well as in case of large vibrations (e.g., strong wind loads and strong earthquake ground motions In an embodiment, the structural members can be associated with any of a building, electrical installation, and communication system installation. In another embodiment, the structural members can be associated with any of vehicle, airplane, aerospace vehicles, ships, and artifacts. In yet another embodiment, the equipment can be selected from scientific equipment, and military equipment, wherein the system or the corresponding devices 100 can reduce undesirable vibrations of the corresponding equipment.

Further, the two ends 104-1, 104-2 of the devices 100 of the system can be attached to structural members 302-1, 302-2 associated with structures or equipment using the configuration as shown in FIG. 3. The threaded ends 204 of the longitudinal member 104 and the coupling members 304-1, 304-2 allow easier and faster installation of the proposed device 100 between structural members of structures or equipment. Further, this can also allow easier replacement and maintenance of one or more energy dissipation devices 100 when required, without removing or affecting the other energy dissipation devices 100.

Thus, the present invention (device and system) provides a simple, efficient, and cost-effective energy dissipation device and system for structures and equipment, which dissipates vibration forces or energy such as seismic activity, wind forces, and man-made vibrations. Besides, the present invention requires a small number of components that are easily available and are also affordable, which can be easily assembled on-site and can be installed in the structure or equipment after they are built. Further, unlike active and semi-active devices, the present invention does not require any source of power to operate, which makes it highly reliable and less prone to failure. Moreover, as all the components of the present invention are easily separable from each other, as a result, in case of failure or damage to any one of the components, the whole device is not required to be replaced and only the faulty component is required to be replaced or serviced.

Figure 4A:
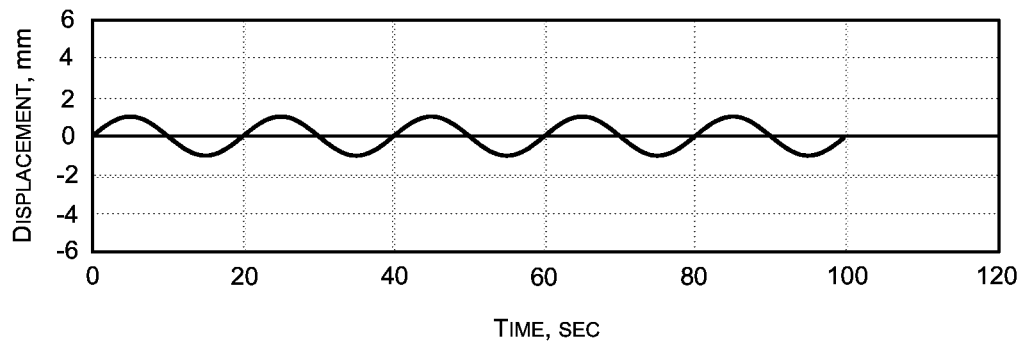
FIGS. 4A to 4C illustrates a graph depicting the displacement of the energy dissipation under different loading conditions.
Figure 4B:
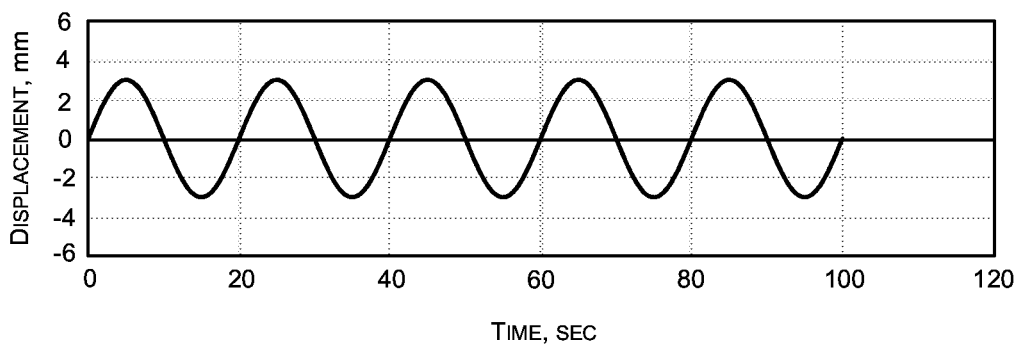
Figure 4C:
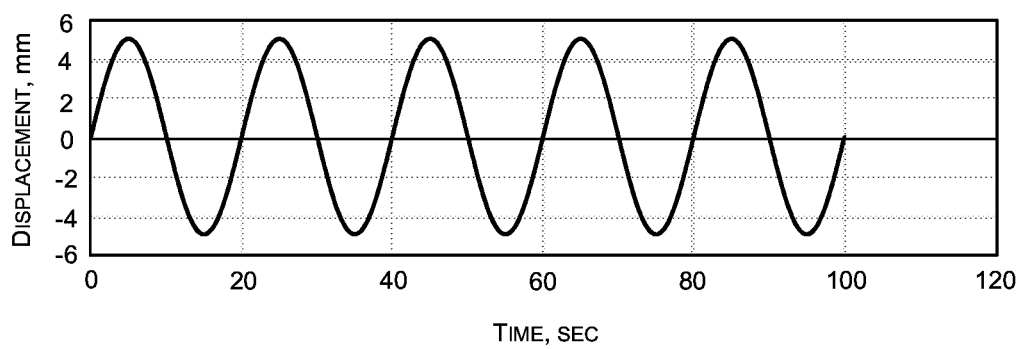

The performance of the proposed energy dissipation device was tested under repeated loading cycles. In the experimental setup, 2 mm steel balls were used to fill in the cylinder after inserting the longitudinal member (shaft) having rods. The device was subjected to sinusoidal displacement loadings having different amplitudes. The shaft of the device was held on one end and the cylinder was clamped from the other end through a housing assembly. The shaft was then subjected to cyclic loading through an actuator. Three displacement amplitudes were considered in the first qualifying tests: 1, 3, and 5 mm as shown in FIGS. 4A to 4C, respectively. The stroke (in mm) and the load response were recorded at every time step and all three experiments were run for 100 seconds.

Figure 5A:
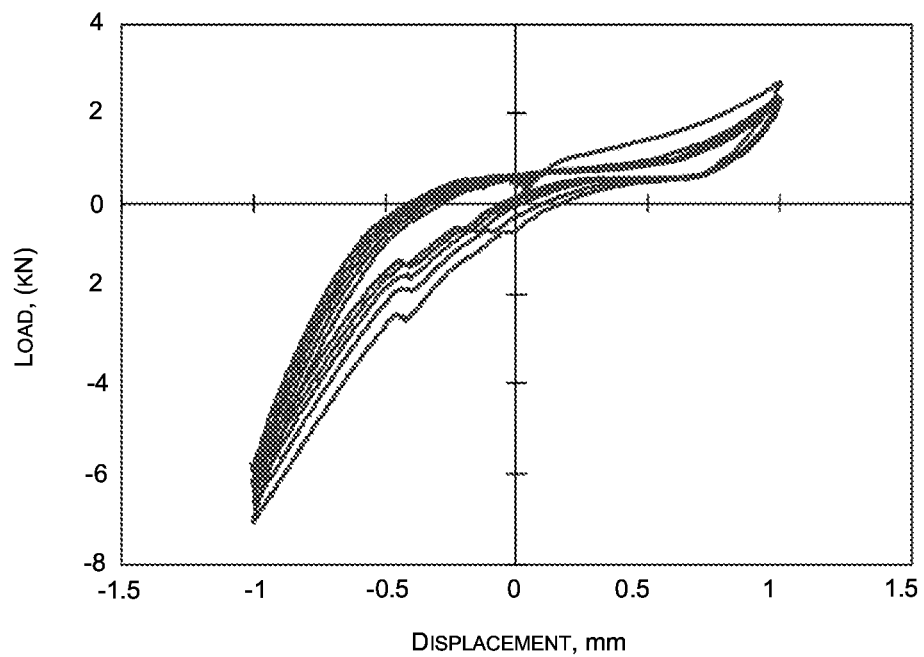
FIGS. 5A to 5C illustrates a graph depicting the load-displacement curve of the energy dissipation device under different loading conditions as shown in FIGS. 4A to 4C.
Figure 5B:
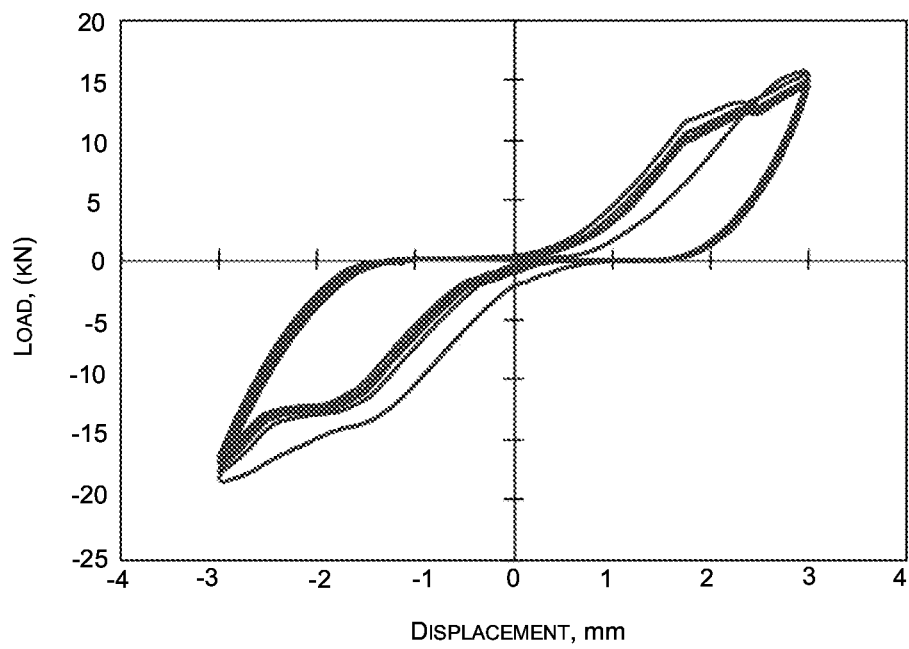
Figure 5C:
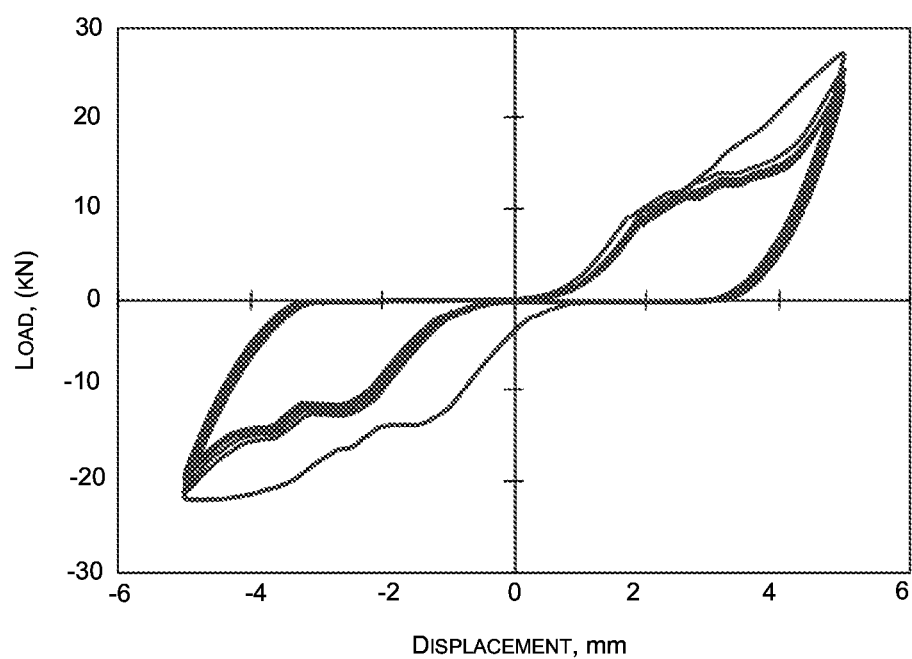

The recorded load-displacement curves are shown in FIGS. 5A to 5C, for the three applied displacement amplitudes as shown in FIGS. 4A to 4C. It was found that at a very small displacement amplitude (i.e., 1 mm, as shown in FIG. 5A), the device was able to dissipate energy as evidenced by the enclosed area under the curve. The asymmetry seen in the curve is primarily due to the re-arrangement of the steel balls inside the cylinder. When the device is placed vertically, the balls in the cylinder re-arrange themselves due to gravity, hence, when the actuator pulls the shaft upward, the rods on the shaft find a small gap, hence, less contact with the balls. The asymmetry of the curve is not pronounced when the device is subjected to 3 mm and 5 mm displacement amplitudes as shown in FIGS. 5B and 5C.

The effective stiffness of the device was calculated for the three loading amplitudes using the following equation:

$$k_{eff} = \frac{F^+ - F^-}{d^+ - d^-}$$

where, $d^+$ and $d^-$ are the maximum positive, respectively, the minimum negative displacement, and $F^+$ and $F^-$ are the corresponding load reactions. Using the experimental data in FIGS. 5A-5C, the average effective stiffness of the device considering the three loading amplitudes was calculated to be keff~5 kN/mm.

The energy dissipated per cycle, ED, of loading is estimated as the area enclosed by the force-displacement hysteresis curves. The effective damping ratio of the device was then be calculated using the following equation:

$$\xi_{eff} = \frac{2E_D}{\pi(F^+ - F^-)(d^+ - d^-)}$$

Using the experimental data in FIGS. 5A-5C, the average effective damping ratio considering the three loading amplitudes was calculated to be $\xi_{eff} \approx 14\%$.

Those skilled in the art would appreciate that the present invention allowed a full understanding of the involved variables in the proposed device and system using the above experimental setup and results, which paved the road to a simple, efficient, and cost-effective energy dissipation solution for structures and equipment, which dissipates vibration forces such as seismic activity, wind forces, and man-made vibrations, and which is easy to be assembled and does not require any source of power to operate.

It is also to be appreciated by a person skilled in the art that while various embodiments and figures of the present disclosure have elaborated the involvement of one energy dissipation device having a specific number of short rods on the longitudinal member, and a specific shape for the hollow cylinder, the longitudinal member, the short rods, and the solid balls, however, the number of devices, the number and shape of rods provided on the longitudinal member, the number and shape of solid balls filled in the present invention, and the shape of the hollow cylinder and longitudinal member are not just limited to the illustrated numbers and shape, but can be of any number and shape based on the requirement, and all such embodiments are also well within the scope of the present disclosure. Further, while various embodiments and figures of the present disclosure have elaborated upon the use of steel for the components of the device, however, the other materials can also be used in the present invention as per requirement and loading, and all such embodiments are well within the scope of the present disclosure.

The present invention overcomes the above-mentioned drawbacks, limitations, and shortcomings associated with exiting active and passive energy dissipation devices. The present invention dissipates energy or forces received by structures and equipment in an event of seismic activity, wind forces, and man-made forces. The present invention provides a simple, efficient, and cost-effective approach for energy dissipation in structures and equipment in an event of seismic activity, wind forces, and man-made forces. The present invention manufactures an energy dissipation device that dissipates energy under small as well as large displacement amplitudes. The present invention manufactures an energy dissipation device that requires a small number of pieces that are affordable and readily available. The present invention provides an energy dissipation device that does not require electrical power to operate. The present invention provides an energy dissipation device that doesn't suffer from re-centering issues (e.g., it doesn't remain in a deformed state by the end of vibrations). The present invention provides an energy dissipation device that is not required to be completely replaced in case of failure or damage to any one of the components, and only the faulty component is required to be replaced or serviced.

Further, different device configurations can be employed based on requirements to suit different types and magnitudes of loads on which the hosting structure is subjected to. Configurations of the device can include the number, position, and shape of the rods attached radially to the shaft and the number, material type, and diameter of the balls. Other configurations can include the length of the cylinder and shaft. With these configurations, user can achieve greater energy dissipation while accommodating small and large displacement amplitudes and loading speeds As used herein, and unless the context dictates otherwise, the term "coupled to" is intended to include both direct coupling (in which two elements are coupled to each other or in contact with each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. An energy dissipation system for structural members and equipment, the system comprising:
   one or more energy dissipation devices adapted to be removably configured with any of the structural members or the equipment, wherein each of the devices comprises:
   a hollow cylindrical member adapted to be filled with a plurality of solid balls; and
   a longitudinal member comprising a plurality of rods protruding radially from the longitudinal member such that the plurality of rods remain perpendicularly oriented from a longitudinal axis or along a length of the longitudinal member, wherein the longitudinal member is movably disposed within the hollow cylindrical member such that two ends of the longitudinal member extend at least partially outside of the hollow cylindrical member and the plurality of rods remains within the hollow cylindrical member, and
   wherein each rod of the plurality of rods comprises a threaded portion adapted to removably attach to one of a plurality of threaded holes of the longitudinal member to cantilever the respective rods relative to the longitudinal member, wherein each threaded hole of the plurality of threaded holes continuously extends through the longitudinal member,
   wherein the two ends of the longitudinal member of each device are adapted to be attached to the structural member or equipment, such that an energy impact on the structural member or the equipment causes movement of the longitudinal member along a longitudinal axis of the hollow cylindrical member, which results in friction between the plurality of solid balls and the plurality of rods, thereby facilitating dissipation of the energy impact,
   wherein the hollow cylindrical member, the plurality of solid balls, the longitudinal member, and the plurality of rods are separable from each other, and wherein the energy dissipation device requires zero electrical power to operate.

2. The system of claim 1, wherein the system comprises a set of coupling members adapted to couple the two ends of the longitudinal member associated with each of the devices to the structural member, or the equipment.

3. The system of claim 2, wherein each of the two ends of the longitudinal member comprises a threaded portion adapted to engage and lock with a first end of the coupling member, and wherein a second end of the coupling member is adapted to be attached to the structural member, or the equipment.

4. The system of claim 1, wherein the structural members are associated with any of a building, electrical installation, and communication system installation, wherein the system or the corresponding devices dissipate the energy imparted by any of seismic activity, wind loads, and man-made vibrations.

5. The system of claim 1, wherein the structural members are associated with any of vehicle, airplane, aerospace vehicles, ships, and artifacts.

6. The system of claim 1, wherein the equipment is selected from scientific equipment, and military equipment, wherein the system or the corresponding devices reduce undesirable vibrations of the corresponding equipment.

7. The system of claim 1, wherein the hollow cylindrical member of at least one of the devices is filled with a viscoelastic fluid, which increases and facilitates dissipation of the received energy.

* * * * *